(12) United States Patent
Leone et al.

(10) Patent No.: US 8,960,138 B2
(45) Date of Patent: Feb. 24, 2015

(54) DUAL CRANKSHAFT ENGINE

(75) Inventors: Thomas G. Leone, Ypsilanti, MI (US); Alvin Henry Berger, Brownstown, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 340 days.

(21) Appl. No.: 13/424,218

(22) Filed: Mar. 19, 2012

(65) Prior Publication Data
US 2013/0239930 A1 Sep. 19, 2013

(51) Int. Cl.
*F02B 75/28* (2006.01)

(52) U.S. Cl.
USPC ....... 123/52.1; 123/52.4; 123/52.6; 123/53.2; 123/53.3; 123/53.5; 123/53.6

(58) Field of Classification Search
USPC ........... 123/52.1, 52.2, 52.3, 52.4, 53.6, 54.1, 123/55.2, 55.4, 55.5, 58.1
See application file for complete search history.

(56) References Cited

U.S. PATENT DOCUMENTS

| | | | |
|---|---|---|---|
| 2,749,893 A * | 6/1956 | Porsche et al. | 123/90.31 |
| 4,834,032 A * | 5/1989 | Brennan | 123/51 BA |
| 5,211,065 A | 5/1993 | Mandella | |
| 5,572,904 A | 11/1996 | Minculescu | |
| 6,058,901 A * | 5/2000 | Lee | 123/197.1 |
| 6,065,440 A * | 5/2000 | Pasquan | 123/198 F |
| 6,189,493 B1 * | 2/2001 | Gray, Jr. | 123/52.4 |
| 6,647,935 B2 | 11/2003 | Aoyama et al. | |
| 7,191,742 B2 * | 3/2007 | Fuchs et al. | 123/55.2 |
| 7,513,224 B2 * | 4/2009 | Heaton | 123/51 R |
| 7,533,639 B1 | 5/2009 | Berger et al. | |
| 7,789,061 B2 | 9/2010 | Ishimitsu | |
| 7,806,101 B2 | 10/2010 | Hu | |
| 2003/0019448 A1 | 1/2003 | Aoyama et al. | |
| 2006/0180018 A1 * | 8/2006 | Kabir et al. | 92/140 |
| 2009/0090315 A1 * | 4/2009 | Uchida | 123/53.6 |
| 2009/0145129 A1 * | 6/2009 | Heaton | 60/712 |
| 2012/0017854 A1 * | 1/2012 | Holscher et al. | 123/2 |

* cited by examiner

*Primary Examiner* — Noah Kamen
*Assistant Examiner* — Grant Moubry
(74) *Attorney, Agent, or Firm* — Julia Voutyras; Alleman Hall McCoy Russell & Tuttle LLP

(57) ABSTRACT

A dual-crankshaft engine is presented. In one embodiment, the engine includes a first crankshaft and a second crankshaft. The second crankshaft is coupled with the first crankshaft such that the first crankshaft and the second crankshaft are horizontally coplanar. The engine further includes a first piston that is operable to reciprocate in a first horizontal cylinder via coupling with the first crankshaft, and a second piston that is operable to reciprocate in a second horizontal cylinder via coupling with the second crankshaft. The second horizontal cylinder is horizontally collinear with and opposing the first horizontal cylinder.

15 Claims, 6 Drawing Sheets

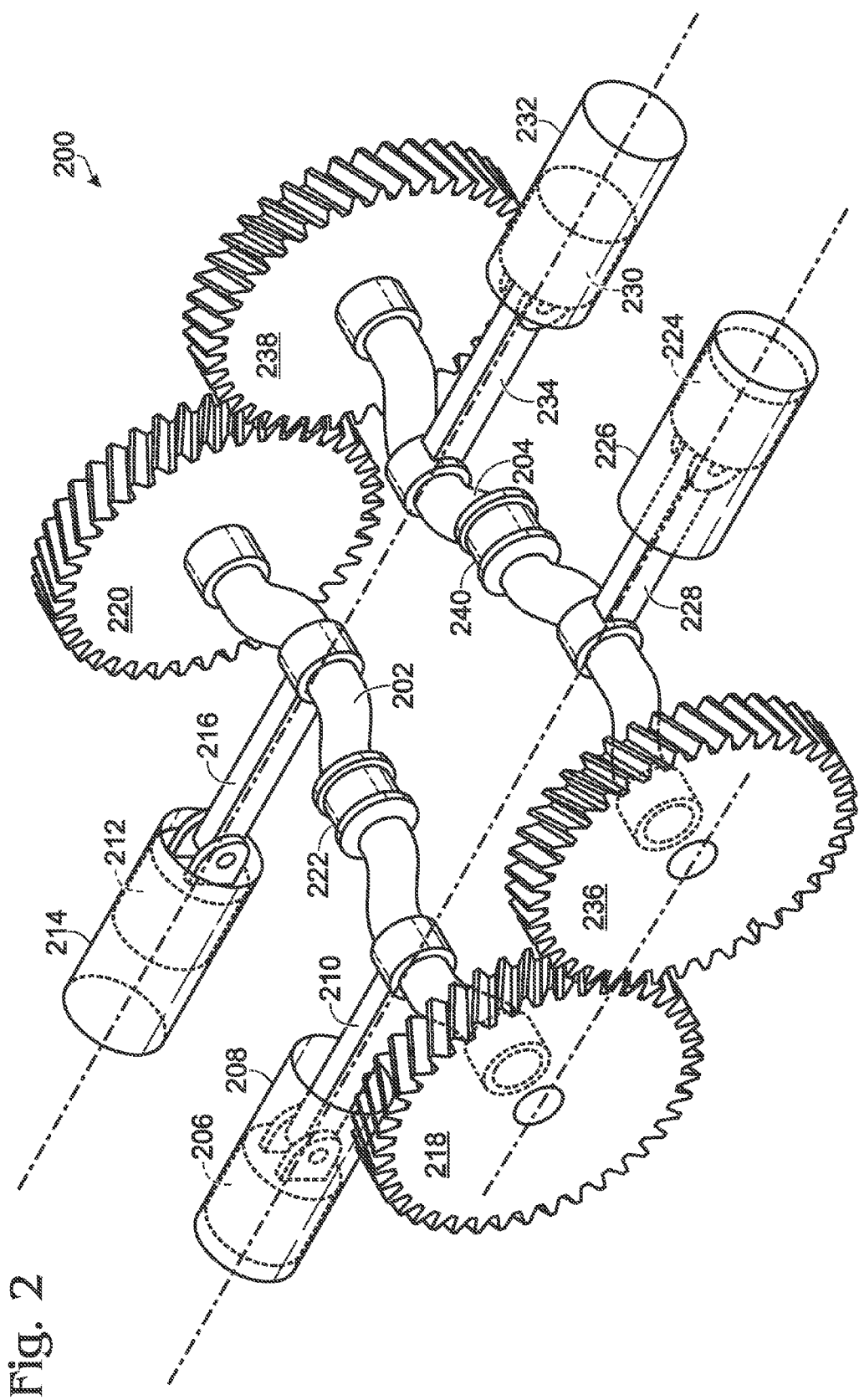

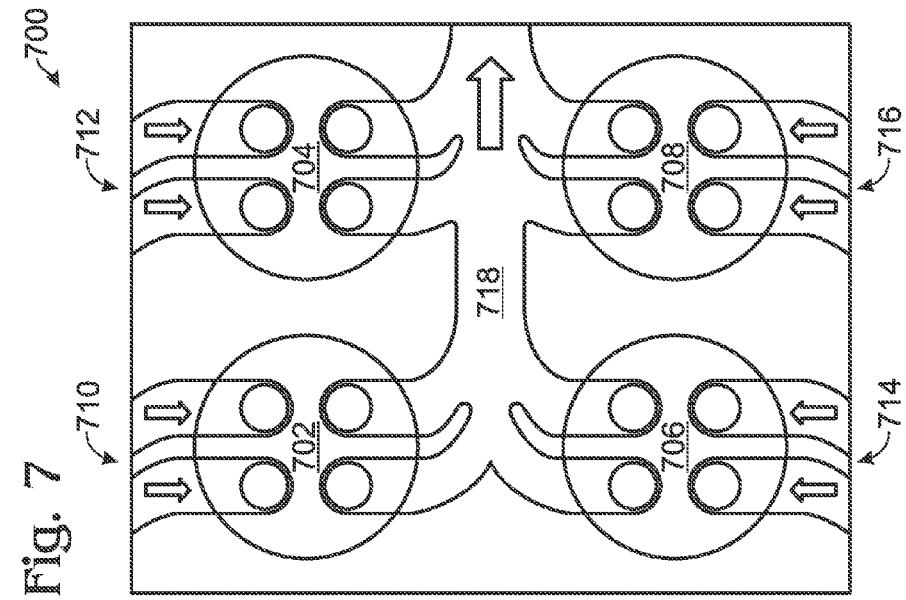
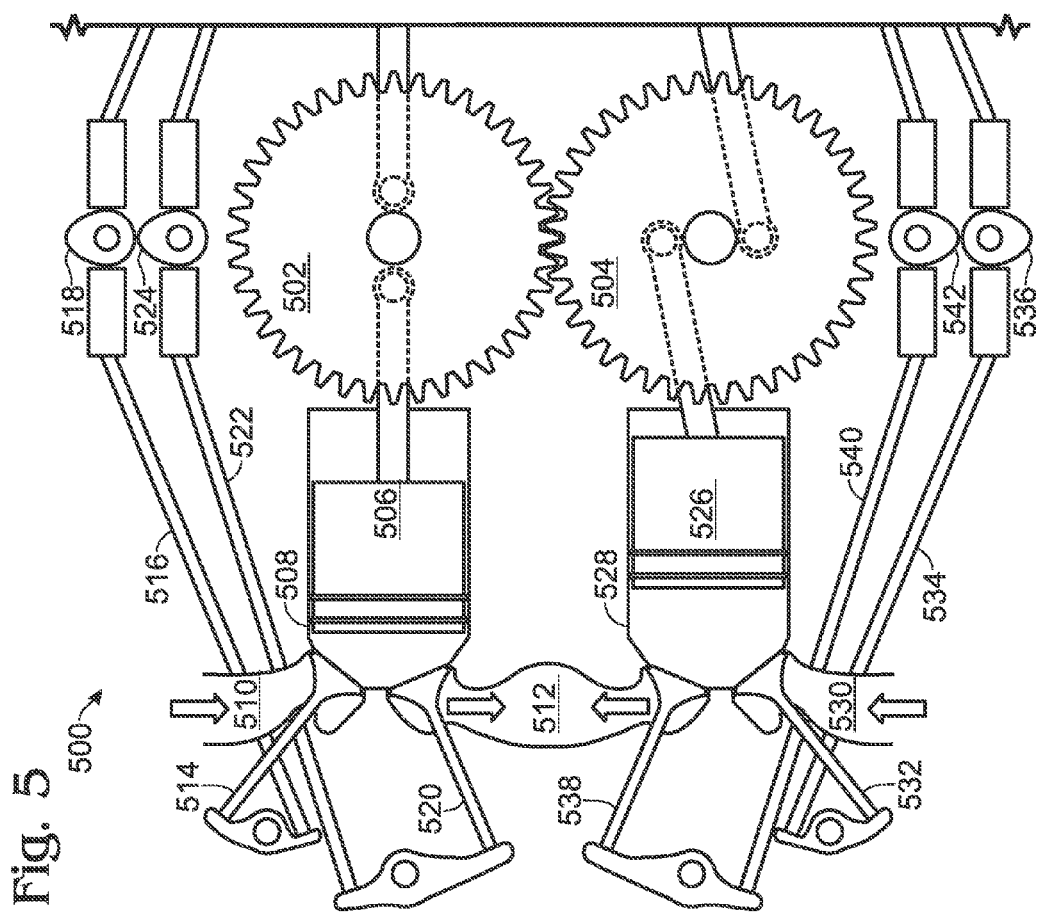

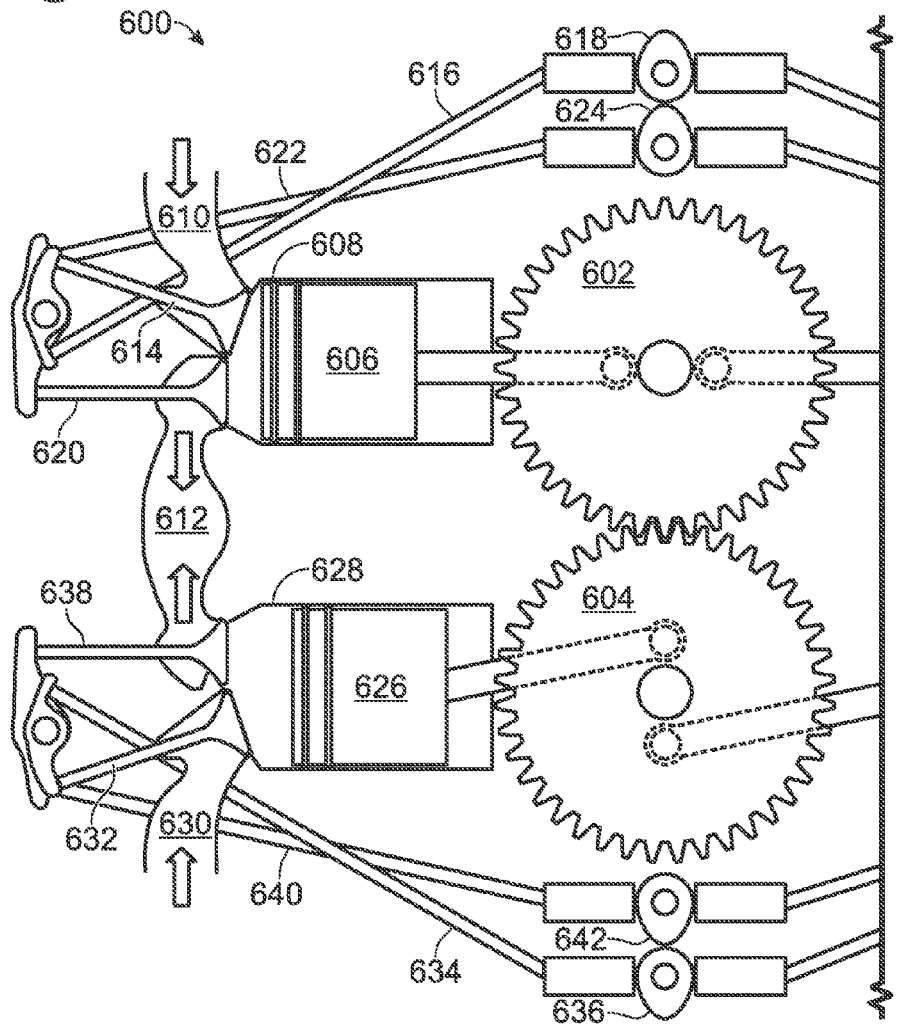

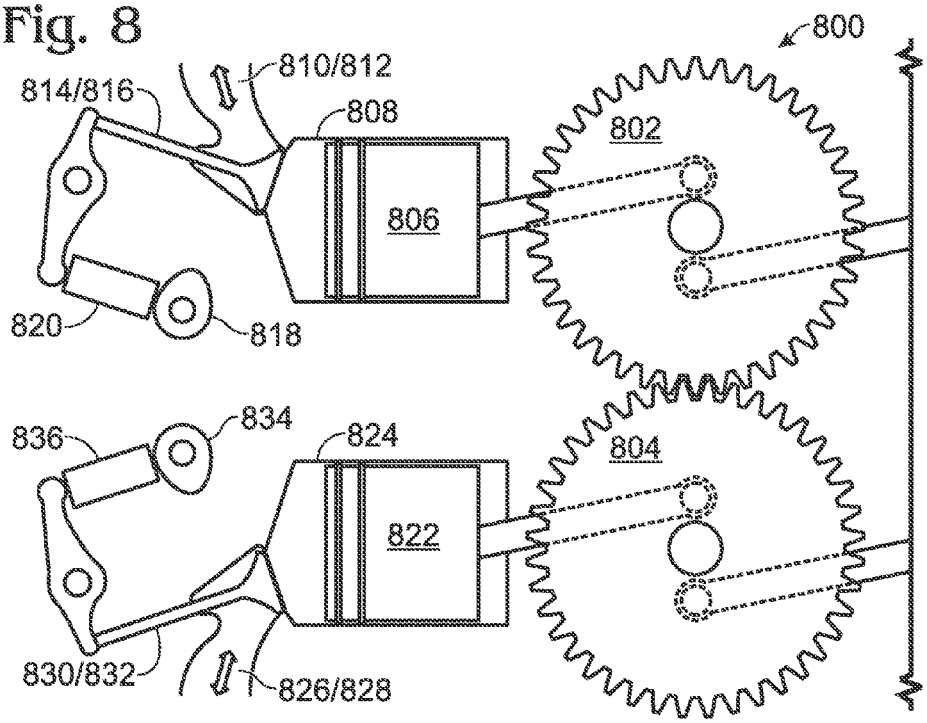
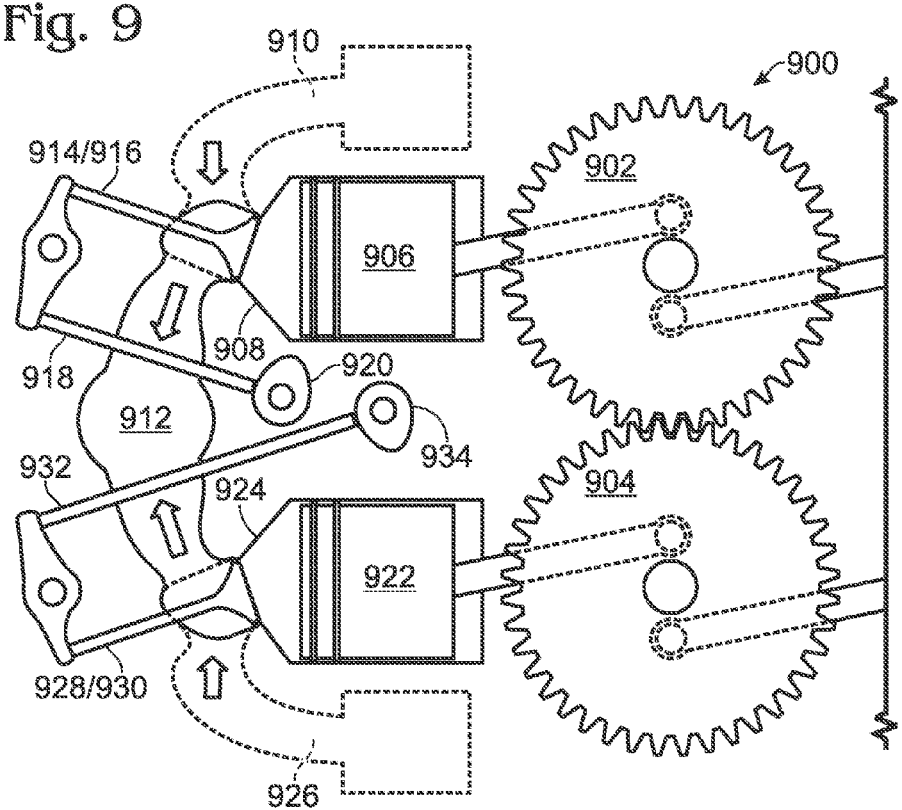

DUAL CRANKSHAFT ENGINE

BACKGROUND AND SUMMARY

Dual counter-rotating crankshafts may be employed in an engine in order to cancel torque pulsations. For example, an engine including dual counter-rotating crankshafts may have a rigid coupling between the crankshafts, so that the acceleration of one crankshaft is counteracted by acceleration of the other crankshaft in the opposite rotational direction. Accordingly, reaction torque imposed upon a powertrain support structure (e.g., engine mounts) may be reduced, and correspondingly noise and vibration sensed inside a vehicle's passenger compartment may be reduced.

One example of a dual counter-rotating crankshaft engine is provided by Berger et al. in U.S. Pat. No. 7,533,639. In this example, vertically oriented cylinders coupled to each crankshaft are paired and aligned in parallel. The dual counter-rotating crankshafts mutually cancel each other's vibrational torque reaction against the powertrain support structure, resulting in a reduced vibration level that lowers the "lug limit," or the feasible engine speed where a torque converter coupled to the engine can remain locked before noise, vibration, harshness (NVH) levels cause the torque converter to be unlocked. The lower lug limit allows for greater efficiency and fuel economy because the torque converter may remain locked at lower engine speeds relative to a torque converter coupled to a single crankshaft engine. The reduced vibration of the powertrain may also enable more extensive lugging operation with some of the engine's cylinders not firing.

However, the inventors herein have identified potential issues with such an approach. As an example, since the vertically oriented cylinders of a four cylinder engine are paired and arranged in parallel, inertial forces acting on the reciprocating pistons cause an inherent unbalanced vibration that requires balance shafts to counteract the vibration in order for the engine to be mechanically balanced. The addition of balance shafts to the engine increases cost, weight, inertia, and friction of the engine. Moreover, the vertical orientation of the cylinders causes the height of the engine to be taller, which may be undesirable for engine fitting, vehicle styling, and raises the center of gravity of the engine, which may affect stability and control of a vehicle in which the engine is installed.

At least some of the above issues may be addressed by an engine including a first crankshaft, a second crankshaft coupled with the first crankshaft such that the first crankshaft and the second crankshaft are horizontally coplanar, a first piston operable to reciprocate in a first horizontal cylinder via coupling with the first crankshaft, and a second piston operable to reciprocate in a second horizontal cylinder that is opposing and horizontally collinear with the first cylinder via coupling with the second crankshaft.

By orienting the cylinders on each of the dual counter-rotating crankshafts so that they are opposing and horizontally collinear, the pistons can be reciprocated in a balanced manner without the need for balance shafts to maintain mechanical balance of the engine. In this way, the dual counter-rotating crankshaft engine may be mechanically balanced without the cost, weight, inertia, and friction penalties attributed to balance shafts. Moreover, by orienting the cylinders horizontally, the center of gravity of the engine may be lowered to provide greater stability relative to an engine with vertically oriented cylinders.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

BRIEF DESCRIPTION OF THE DRAWINGS

The subject matter of the present disclosure will be better understood from reading the following detailed description of non-limiting embodiments, with reference to the attached drawings, where:

FIG. 2 shows an embodiment of a four-cylinder engine including two crankshafts that are horizontally coplanar.

FIG. 5 shows an embodiment of a pushrod valvetrain that may be implemented with an engine according to the present description.

FIG. 6 shows another embodiment of a pushrod valvetrain that may be implemented with an engine according to the present description.

FIG. 7 shows an embodiment of an intake and exhaust layout that may be implemented with an engine according to the present description.

FIG. 8 shows another embodiment of a valvetrain that may be implemented with an engine according to the present description.

FIG. 9 shows another embodiment of a valvetrain that may be implemented with an engine according to the present description.

DETAILED DESCRIPTION

The present application describes various embodiments of a dual counter-rotating crankshaft engine that includes horizontally oriented and opposing cylinders in what may be referred to as a "boxer" engine configuration. The "boxer" concept may include modules of two cylinders that are located on opposite sides of an engine in approximately linear alignment with each other, The piston motions inside those opposing cylinders may be "mirror images" of each other so that the forces of acceleration of the two pistons are equal and opposite and thereby cancel each other. When this pair of pistons is coupled to a single crankshaft, the associated connecting rods may be coupled one hundred eighty degrees opposite from each other; and therefore the two cylinders cannot be truly collinear with each other. The width of the connecting rods and the thickness of the crankshaft web that connects the two crankpins forces one cylinder to be installed farther forward than the other cylinder. The acceleration forces acting on the reciprocating pistons still cancel each other, but because of the axial offset, an unbalanced couple may be created. When multicylinder engines are constructed with several boxer modules, it is possible to improve the engine's balance characteristics by orienting and phasing the modules so that their inherent unbalances counter one another as discussed in further detail herein.

Figure 1:
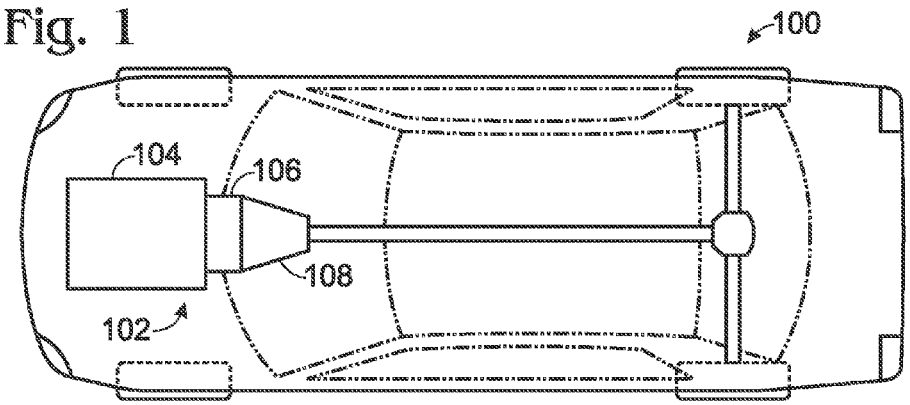
FIG. 1 schematically shows a vehicle including an engine according to the present description.
Figure 3:
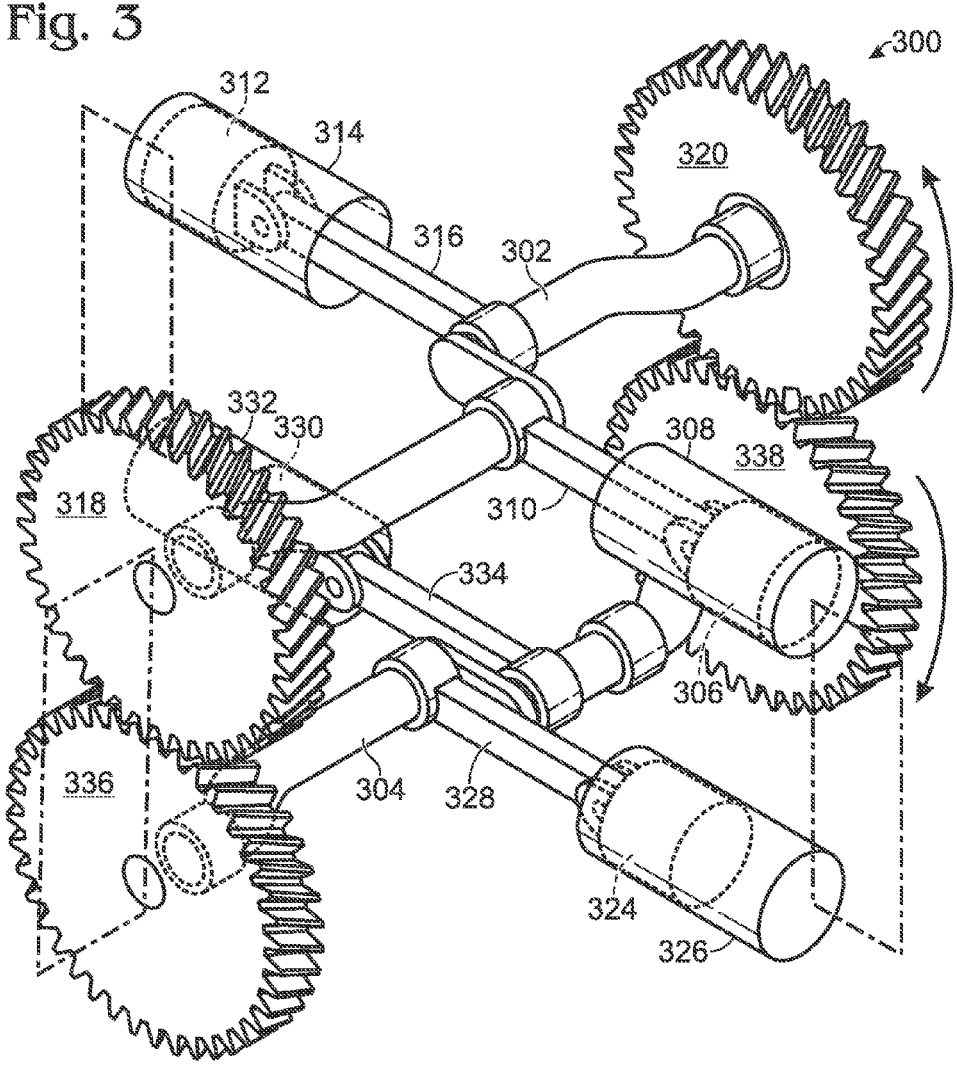
FIG. 3 shows an embodiment of a four-cylinder engine including two crankshafts that are vertically coplanar.
Figure 4:
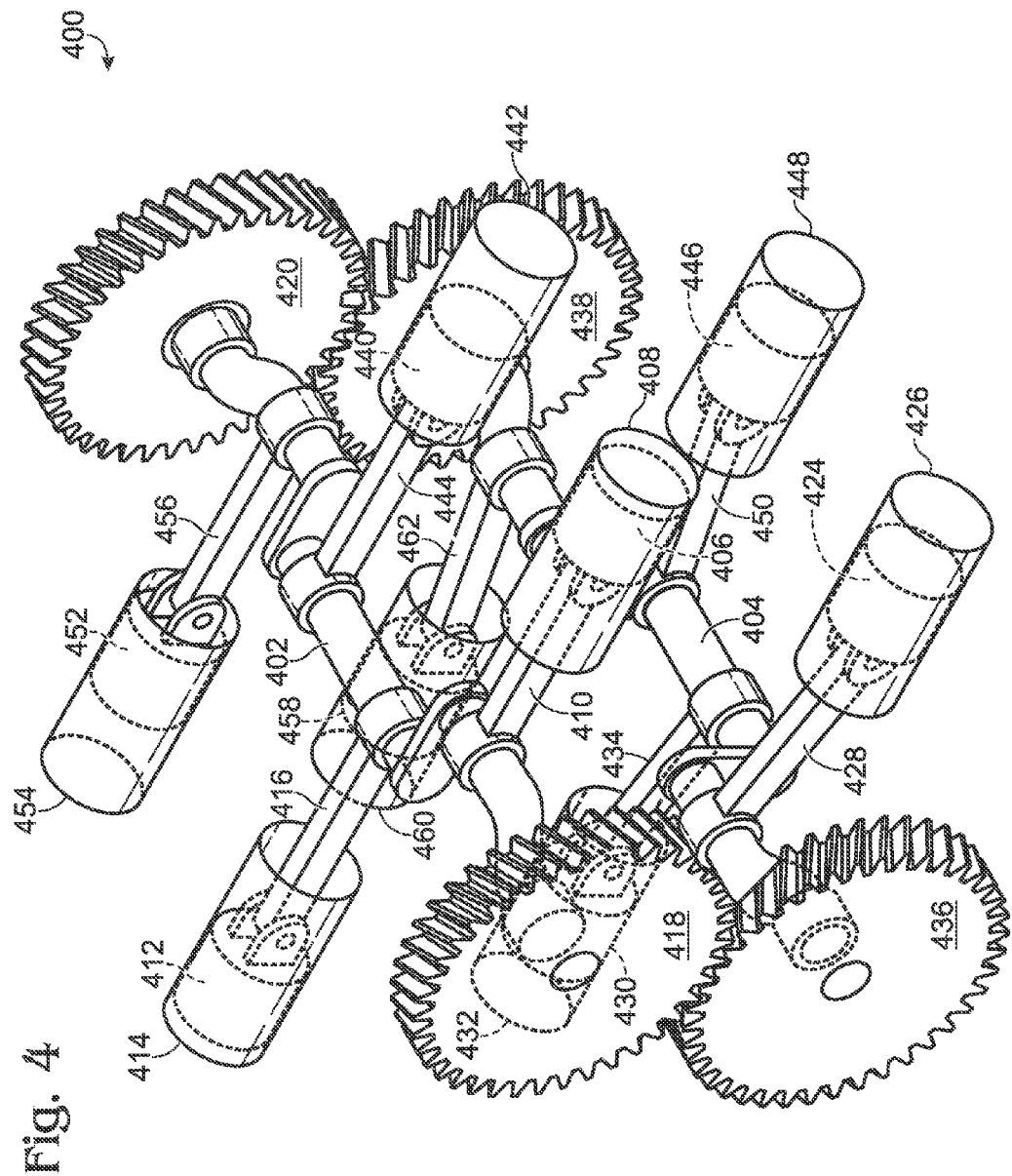
FIG. 4 shows an embodiment of an eight-cylinder engine according to the present description.

The dual counter-rotating crankshaft boxer engine may be implemented in a vehicle as shown in FIG. 1. An embodiment of the engine that includes four cylinders and horizontally coplanar crankshafts is shown in FIG. 2. An embodiment of the engine that includes four cylinders and vertically coplanar crankshafts is shown in FIG. 3. An embodiment of the engine that includes eight cylinders and vertically coplanar crankshafts is shown in FIG. 4. Various embodiments of valvetrains that may be implemented with an engine configuration where the crankshafts are vertically coplanar (e.g., the engine shown in FIGS. 3 and 4) are shown in FIGS. 5-6 and 8-9. Example intake and exhaust paths that may be incorporated into a cylinder head for four cylinders are shown in FIG. 7. In one example, such a cylinder head may be implemented on each opposing bank of the eight-cylinder engine shown in FIG. 4. The subject matter of the present description is now described by way of example and with reference to certain illustrated embodiments. Components that may be substantially the same in two or more embodiments are identified coordinately and are described with minimal repetition. It will be noted, however, that components identified coordinately in different embodiments of the present description may be at least partly different. It will be further noted that the drawings included in this description are schematic. Views of the illustrated embodiments are generally not drawn to scale; aspect ratios, feature size, and numbers of features may be purposely distorted to make selected features or relationships easier to see.

FIG. 1 schematically shows a vehicle 100 that includes a powertrain 102 that delivers power generated by a dual counter-rotating crankshaft engine 104 to the road to propel the vehicle 100. In particular, the engine 104 includes cylinders that are oriented horizontally relative to the dual counter-rotating crankshafts to provide mechanical balance of the engine without the need for balance shafts. Torque output by the engine 104 is transmitted to a transmission 108, and further through components of the powertrain 102 to propel the vehicle 100. In some embodiments, the engine 104 is coupled to a torque converter 106. In the vehicle installation, the engine 104 may internally cancel inertial reaction torques against a powertrain support structure of the vehicle 100 to which the engine 104 may be mounted in order to substantially reduce noise and vibration sensed inside a passenger compartment of the vehicle 100. The smoothed reaction torque permits the torque converter 106 to be locked at lower engine speeds relative to a single-crankshaft engine configuration, and it also permits some cylinders to be deactivated during operation at part load or no load. In this way, the engine operates at a higher efficiency with increased fuel economy.

It will be appreciated that the vehicle 100 may take any suitable form including a vehicle that travels on the road, an off-highway vehicle, a marine vehicle, an airplane, etc. without departing from the scope of the present description. Although the powertrain 102 is shown as a rear-wheel drive configuration, it will be appreciated that any suitable powertrain configuration may be implemented in the vehicle 100 without departing from the scope of the present description. Also, note that vehicle 100 does not necessarily need to be a conventional "vehicle." In some embodiments, the engine 104 may be included in a suitable engine powered machine that is sensitive to the engine's vibration.

FIG. 2 shows an embodiment of a dual counter-rotating crankshaft engine 200 where the crankshafts are horizontally coplanar. The engine 200 includes a first crankshaft 202 and a second crankshaft 204. The second crankshaft 204 is operatively coupled with the first crankshaft 202 such that the first crankshaft 202 and the second crankshaft 204 are horizontally coplanar in the engine 200 in what may be referred to as a "side-by-side" configuration. In particular, a centerline of the first crankshaft 202 is horizontally coplanar with a centerline of the second crankshaft 204. Note the centerlines shown in FIG. 2 are oriented horizontally relative to the engine 200 (or a cylinder block of the engine 200).

A first piston 206 is operable to reciprocate in a first horizontal cylinder 208 via coupling with the first crankshaft 202. The first piston 206 is coupled to the first crankshaft 202 via a first connecting rod 210. A second piston 224 is operable to reciprocate in a second horizontal cylinder 226 via coupling with the second crankshaft 204. The second piston 224 is coupled to the second crankshaft 204 via a second connecting rod 228. The two crankshafts are rotationally coupled so that combustion in either horizontal cylinder causes equal magnitude of reciprocation of both pistons in opposite directions and equal magnitude of rotation of both crankshafts in opposite rotational directions that mutually oppose each other's torsional reaction against a cylinder block of the engine 200. A centerline of the first horizontal cylinder 208 is horizontally collinear with a centerline of the second horizontal cylinder 226. The first horizontal cylinder 208 is oriented horizontally relative to the first crankshaft 202. The second horizontal cylinder 226 is oriented horizontally relative to the second crankshaft 204 in a horizontal direction that opposes the horizontal direction of first horizontal cylinder 208. A centerline of the first and second cylinders may be parallel to a plane of the first and second crankshafts. The first and second horizontal cylinders 208 and 226 may further be oriented horizontally relative to a cylinder block of the engine 200.

The crankpin for the first piston 206 is rotationally positioned on the first crankshaft 202 such that the first piston 206 is top dead center in the first horizontal cylinder 208 when the second piston 224 is top dead center in the second horizontal cylinder 226. Accordingly, force generated by reciprocation of the first piston 206 is balanced by force generated by reciprocation of the second piston 224.

A third piston 212 is operable to reciprocate in a third horizontal cylinder 214 via coupling with the first crankshaft 202. The third piston 212 is coupled to the first crankshaft 202 via a third connecting rod 216. A fourth piston 230 is operable to reciprocate in a fourth horizontal cylinder 232 via coupling with the second crankshaft 204. The fourth piston 230 is coupled to the second crankshaft 204 via a fourth connecting rod 234. A centerline of the third horizontal cylinder 214 is horizontally collinear with a centerline of the fourth horizontal cylinder 232. The third horizontal cylinder 214 is oriented horizontally relative to the first crankshaft 202. The fourth horizontal cylinder 232 is oriented horizontally relative to the second crankshaft 204 in a horizontal direction that opposes the horizontal direction of the third horizontal cylinder 214. The third and fourth horizontal cylinders 214 and 232 may further be oriented horizontally relative to a cylinder block of the engine 200. Accordingly, force generated by reciprocation of the third piston 212 is balanced by force generated by reciprocation of the fourth piston 230.

The crankpin for the third piston 212 is rotationally positioned on the first crankshaft 202 such that the third piston 212 is top dead center in the third horizontal cylinder 214 when the fourth piston 230 is top dead center in the fourth horizontal cylinder 232. Accordingly, force generated by reciprocation of the third piston 212 is balanced by force generated by reciprocation of the fourth piston 230. Both crankshafts carry equal rotating inertia in order to mechanically balance the engine 200 and produce equal but opposite reaction torques against the powertrain support structure.

In some embodiments, the firing order of the cylinders/pistons in the engine 200 may be set such that each cylinder/piston fires at a different time, preferably with equal crankshaft rotational interval between firing pulses. By setting the firing order such that each cylinder fires at a different time, double firing may be avoided. Double firing may cause substantially double the torsional vibration in the crankshafts that may result in variations in engine torque output. In other words, by single firing each of the cylinders, engine torque output may be smoothed relative to engine configurations that double fire cylinders.

The first crankshaft 202 includes a first helical gear 218 positioned at a first end of the first crankshaft 202 and a second helical gear 220 positioned at a second end of the first crankshaft 202. The first helical gear 218 and the second helical gear 220 may fashion a helical gear set that is rotatable in the first rotational direction. The first helical gear 218 and the second helical gear 220 include teeth that are angled in the same direction such that the first helical gear 218 and the second helical gear 220 have the same handedness.

The second crankshaft 204 includes a third helical gear 236 positioned at a first end of the second crankshaft 204 and a fourth helical gear 238 positioned at a second end of the second crankshaft 204. The third helical gear 236 and the fourth helical gear 238 may fashion a helical gear set that is rotatable in the second rotational direction. The third helical gear 236 and the fourth helical gear 238 include teeth that are angled in the same direction such that the third helical gear 236 and the fourth helical gear 238 have the same handedness.

The teeth of the first helical gear 218 and the teeth of the third helical gear 236 may be arranged at opposing angles such that the teeth mesh to operatively couple the first helical gear 218 and the third helical gear 236. Likewise, the teeth of the second helical gear 220 and the teeth of the fourth helical gear 238 may be arranged at opposing angles such that the teeth mesh to operatively couple the second helical gear 220 and the fourth helical gear 238. Upon assembly of the engine, the crankshafts may be elastically twisted so that there may be a nominal torsional preload across both sets of meshing gears. The torsional preload may prevent gear rattle between the two crankshafts as well as backlash between the two crankshafts. Moreover, the torsional preload may be greater than the torsion that would be passed to a crankshaft during a firing pulse. Accordingly, the torsion generated by a firing pulse may not be greater than the torsional preload between the helical gear mesh, and no rotational backlash may occur between the two crankshafts.

Furthermore, since the helical gears at opposite ends of each crankshaft are transmitting torque in opposing directions, the resulting thrust force between each crankshaft and a cylinder block of the engine 200 may be reduced relative to a configuration the does not include helical gears having the same handedness on each end of a crankshaft. In the configuration of engine 200, the forward and backward rotating inertias of the two crankshafts match each other and the torsional accelerations of the two crankshafts are equal, but opposite, so the only torque reacted against the cylinder block would be whatever is imposed from an outside source, such as from the powertrain output shaft or from ancilliary equipment such as the engine's valve train. In one example, a moment of inertia of the first crankshaft along with a first mechanism that is coupled tightly with the first crankshaft to rotate in the same direction as the first crankshaft is equivalent to a moment of inertia of the second crankshaft along with a second mechanism that is coupled tightly with the second crankshaft to rotate in the same direction as the second crankshaft.

As torque is passed from one crankshaft to the other, the helically cut gears sets may produce equal, but opposite, axial thrust forces on both crankshafts. Accordingly, the first crankshaft 202 includes thrust control bearings 222 and the second crankshaft 204 includes thrust control bearings 240.

In some embodiments, the centerline of the first crankshaft 202, the centerline of the second crankshaft 204, the centerline of the first horizontal cylinder 208, the centerline of the second horizontal cylinder 226, the centerline of the third horizontal cylinder 214, and the centerline of the fourth horizontal cylinder 232 may be horizontally coplanar. In some embodiments, the centerline of the first horizontal cylinder 208, the centerline of the second horizontal cylinder 226, the centerline of the third horizontal cylinder 214, and the centerline of the fourth horizontal cylinder 232 may be offset from the centerline of the first crankshaft 202 and the centerline of the second crankshaft 204. For example, the centerline of the first horizontal cylinder 208, the centerline of the second horizontal cylinder 226, the centerline of the third horizontal cylinder 214, and the centerline of the fourth horizontal cylinder 232 may be positioned above or below the centerline of the first crankshaft 202 and the centerline of the second crankshaft 204. In one example, a centerline of the first crankshaft 202 and a centerline of the second crankshaft 204 are coplanar in a first plane, and a centerline of the first cylinder 208 and a centerline of the second cylinder 226 are coplanar in a second plane that is parallel to and offset from the first plane. By offsetting the cylinders relative to the crankshafts, side force and friction applied to the piston on the expansion stroke may be reduced.

The first and second crankshafts 202 and 204 include counterweights (not shown) to counter the centrifugal force acting on the crankpins and on the rotating portion of the connecting rods. Note that the engine 200 shown on FIG. 2 includes two pairs of collinear cylinders, with each pair of collinear cylinders containing pistons that operate in "mirror image" of each other, thus producing equal, but opposite, and mutually cancelling inertial forces of reciprocation, for substantially no net reaction against the powertrain support structure (engine mounts). Other configurations of this concept could have only one pair of collinear cylinders for a two cylinder engine, or possibly three or more pairs of collinear cylinders for six cylinders or more without departing from the scope of the present disclosure. Furthermore, one or more of the cylinders may be deactivated under some operating conditions. For example, one or more of the cylinder may be deactivated at part load to improve engine efficiency. Cylinder deactivation in some engines may be limited by noise and vibration caused by reaction forces at the engine mounts, so a dual counter-rotating crankshaft engine may be able to deactivate cylinders more often, and/or deactivate cylinders at unequal firing intervals.

In contrast to the engine 200, some "boxer" engines, which operate with a single crankshaft, include pairs of cylinders that are oriented parallel with each other, but on opposite sides of the crankshaft with pistons that reciprocate in phase with each other, but in opposing directions. In such a configuration, it is impossible to locate two opposing crankpins at the same axial position along the length of a single crankshaft. Instead, the two opposing cylinder/piston assemblies may be installed at different positions along the length of the single crankshaft. The two crankpins are rotationally oriented one hundred eighty degrees apart from each other to generate piston reciprocations that are equal to each other in magnitude and phase angle, but in opposing directions, except for their offset in the direction of the crankshaft's axis of rotation. The magnitude of cylinder offset must be at least equal to the sum of the length of a connecting rod bearing plus the thickness of the web on the crankshaft that connects to both crank pins. The forces of reciprocation acting on the pair of pistons mutually cancel each other, but those forces multiplied by the magnitude of cylinder offset generate first and second order yawing couples that react against the engine's cylinder block. Also, on this single crankshaft two cylinder boxer configuration, any acceleration or deceleration of the crankshaft rotation imposes a rotational moment against the engine's cylinder block.

FIG. 3 shows an embodiment of a dual counter-rotating crankshaft engine 300 where the crankshafts are vertically coplanar. Components of the engine 300 that may be substantially the same as those of the engine 200 are identified in the same or similar way and are described no further. However, it will be noted that components identified in the same way in different embodiments of the present description may be at least partly different.

The engine 300 includes a first crankshaft 302 and a second crankshaft 304. The second crankshaft 304 is operatively coupled with the first crankshaft 302 such that the first crankshaft 302 and the second crankshaft 304 are vertically coplanar in the engine 300 in what may be referred to as an "over-under" configuration. In particular, a centerline of the first crankshaft 302 is vertically coplanar with a centerline of the second crankshaft 304. Note a long side of each of the planes shown in FIG. 3 is oriented vertically relative to the engine 300 (or a cylinder block of the engine 300).

A first piston 306 is operable to reciprocate in a first horizontal cylinder 308 via coupling with the first crankshaft 302. The first piston 306 is coupled to the first crankshaft 302 via a first connecting rod 310. A second piston 312 is operable to reciprocate in a second horizontal cylinder 314 via coupling with the first crankshaft 302. The second piston 312 is coupled to the first crankshaft 302 via a second connecting rod 316. A centerline of the first horizontal cylinder 308 is parallel to, but axially offset with a centerline of the second horizontal cylinder 314. The first horizontal cylinder 308 is oriented horizontally relative to the first crankshaft 302. The second horizontal cylinder 314 is oriented horizontally relative to the first crankshaft 302 in the opposite horizontal direction from the orientation of the first horizontal cylinder 308. The first and second horizontal cylinders 308 and 314 may further be oriented horizontally relative to a cylinder block of the engine 300. This combination of the first and second cylinders 308 and 314, with the first and second pistons 306 and 312, and the first and second connecting rods 310 and 316 imposes first and second order yawing couples upon the cylinder block, as well as rotational reactions corresponding to rotational accelerations of the first crankshaft 302.

A third piston 324 is operable to reciprocate in a third horizontal cylinder 326 via coupling with the second crankshaft 304. The third piston 324 is coupled to the second crankshaft 304 via a third connecting rod 328. A fourth piston 330 is operable to reciprocate in a fourth horizontal cylinder 332 via coupling with the second crankshaft 304. The fourth piston 330 is coupled to the second crankshaft 304 via a fourth connecting rod 334. A centerline of the third horizontal cylinder 326 is parallel to, and horizontally coplanar with a centerline of the fourth horizontal cylinder 332. The third horizontal cylinder 326 is oriented horizontally relative to the second crankshaft 304. The fourth horizontal cylinder 332 is oriented horizontally relative to the second crankshaft 304 in the opposite horizontal direction from the orientation of the third horizontal cylinder 326. The third and fourth horizontal cylinders 326 and 332 may further be oriented horizontally relative to a cylinder block of the engine 300.

The first and second horizontal cylinders 308 and 314, coupled to the first crankshaft 302, form an upper two cylinder boxer module of the engine 300 and the third and fourth horizontal cylinders 326 and 332, coupled to the second crankshaft 304, form a lower two cylinder boxer module of the engine 300. In the illustrated embodiment, the first and third cylinders 308 and 326 comprise the left bank that is positioned ahead of the right bank, comprised of the second and fourth cylinders 314 and 332. It will be appreciated that the right bank may be positioned ahead of the left bank on the crankshafts without departing from the scope of the present description.

The crankpin for the first piston 306 is rotationally positioned on the first crankshaft 302 such that the first piston 306 is top dead center in the first horizontal cylinder 308 when the second piston 312 is also at top dead center in the second horizontal cylinder 314. In other words, the first piston 306 is phased to reciprocate in a motion equal to, but in opposite direction from the second piston 312. The crankpin for the third piston 324 is rotationally positioned on the second crankshaft 304 such that the third piston 324 is bottom dead center in the third horizontal cylinder 326 when the fourth piston 330 is bottom dead center in the fourth horizontal cylinder 332. In other words, the third piston 312 is phased to reciprocate in a motion equal to, but in opposite direction from the fourth piston 330. Accordingly, forces generated by reciprocation of the first and second pistons 306 and 312 cancel each other while the forces generated by reciprocation of the third and fourth pistons 324 and 330 cancel each other.

The second crankshaft 304 may be coupled with the first crankshaft 302 such that the first crankshaft 302 and the second crankshaft 304 may be coplanar and the second crankshaft rotates 304 in an opposite direction from the first crankshaft 302. Both crankshafts carry equal rotating inertia so that angular acceleration and deceleration of the dual crankshaft system will produce no net angular acceleration of the cylinder block about the axes of the crankshafts. For example, whenever a clockwise acceleration of one crankshaft results in a counterclockwise reaction against the cylinder block, an equal magnitude counterclockwise acceleration of the other crankshaft will exert a cancelling clockwise reaction against the cylinder block, resulting in no net torque acting on the cylinder block except for outside effects, such a torque passed through an output shaft to the vehicle's axle, or from unbalance of ancillary equipment such as the engine's valve train. The first order yawing couple generated by the upper two cylinder boxer module is phased to cancel the first order yawing couple generated by the lower two cylinder boxer module. However, the second order yawing couples generated by both the upper and lower two cylinder boxer modules are phased to add to each other. The four cylinder engine illustrated in FIG. 3 has inertial balance characteristics very much like those of a single crankshaft four cylinder boxer engine, but has the advantage of generating no inertial rolling vibration about the crankshafts' axes of vibration in response to the crankshaft's torsional accelerations.

In some embodiments, the firing order of the cylinders in the engine 300 may be set such that each cylinder fires at a different time. By setting the firing order such that each cylinder fires at a different time, double firing may be avoided. Double firing may cause substantially double the torsional vibration in the crankshafts that may result in variations in engine torque output. In other words, by single firing each of the cylinders, especially with even firing intervals, engine torque output may be smoothed relative to engine configurations that double fire cylinders.

In some embodiments, a centerline of the first cylinder 308 and a centerline of the fourth cylinder 332 may be parallel to each other and perpendicular to a plane including a centerline of the first crankshaft 302 and a centerline of the second crankshaft 304. Likewise, a centerline of the second cylinder 314 and a centerline of the third cylinder 326 may be parallel to each other and perpendicular to the plane including the centerline of the first crankshaft 302 and the centerline of the second crankshaft 304.

In some embodiments, a centerline of the first crankshaft 302 and a centerline of the first cylinder 308 may be coplanar in a first plane, a centerline of the second crankshaft 304 and a centerline of the fourth cylinder 332 may be coplanar in a second plane, and the first plane may be parallel to the second plane. Likewise, a centerline of the first crankshaft 302 and a centerline of the second cylinder 314 may be coplanar in a first plane, a centerline of the second crankshaft 304 and a centerline of the third cylinder 326 may be coplanar in a second plane, and the first plane may be parallel to the second plane.

In some embodiments, a centerline of the first cylinder 308 and a centerline of the second cylinder 314 may be offset from and do not intersect a centerline of the first crankshaft 302. Likewise, a centerline of the third cylinder 326 and a centerline of the fourth cylinder 330 may be offset from and do not intersect a centerline of the second crankshaft 304.

In some embodiments, a centerline of the first cylinder 308 and a centerline of the third cylinder 326 may be parallel to each other and coplanar in a first plane. Likewise, a centerline of the second cylinder 314 and a centerline of the fourth cylinder 332 may be parallel to each other and coplanar in a second plane that is parallel to the first plane. Furthermore, the first plane and second plane may be perpendicular to a third plane that includes a centerline of the first crankshaft 302 and a centerline of the second crankshaft 304.

FIG. 4 shows an embodiment of an eight-cylinder dual counter-rotating crankshaft engine 400 where the crankshafts are vertically coplanar. Components of the engine 400 that may be substantially the same as those of the engine 300 are identified in the same or similar way and are described no further. However, it will be noted that components identified in the same way in different embodiments of the present description may be at least partly different.

A first piston 406 is operable to reciprocate in a first horizontal cylinder 408 via coupling with a first crankshaft 402. The first piston 406 is coupled to the first crankshaft 402 via a first connecting rod 410. A second piston 412 is operable to reciprocate in a second horizontal cylinder 414 via coupling with the first crankshaft 402. The second piston 412 is coupled to the first crankshaft 402 via a second connecting rod 416. A centerline of the first horizontal cylinder 408 is horizontally coplanar and parallel with a centerline of the second horizontal cylinder 414. The first horizontal cylinder 408 is oriented horizontally relative to the first crankshaft 402. The second horizontal cylinder 414 is oriented horizontally relative to the first crankshaft 402 in the opposite horizontal direction from the orientation of the first horizontal cylinder 408. The first and second horizontal cylinders 408 and 414 may further be oriented horizontally relative to a cylinder block of the engine 400. The combination of the first and second cylinders 408 and 414, coupled to the first crankshaft 402, comprise an upper front two cylinder boxer module with inherent first order and second order yawing couples, as well as rolling vibration about the crankshaft's axis of rotation in response to the crankshaft's torsional accelerations.

A third piston 440 is operable to reciprocate in a third horizontal cylinder 442 via coupling with the first crankshaft 402. The third piston 440 is coupled to the first crankshaft 402 via a third connecting rod 444. A fourth piston 452 is operable to reciprocate in a fourth horizontal cylinder 454 via coupling with the first crankshaft 402. The fourth piston 452 is coupled to the first crankshaft 402 via a fourth connecting rod 456. A centerline of the third horizontal cylinder 442 is horizontally coplanar with a centerline of the fourth horizontal cylinder 454. The third horizontal cylinder 442 is oriented horizontally relative to the first crankshaft 402. The fourth horizontal cylinder 454 is oriented horizontally relative to the first crankshaft 402 in the opposite horizontal direction from the orientation of the third horizontal cylinder 442. The third and fourth horizontal cylinders 442 and 454 may further be oriented horizontally relative to a cylinder block of the engine 400. This combination of the third and fourth cylinders 442 and 454, coupled to the first crankshaft 402, comprise an upper rear two cylinder boxer module with inherent first and second order yawing couples, as well as rolling vibration about the crankshaft's axis of rotation in response to the crankshaft's torsional accelerations.

The combination of the first, second, third, and fourth cylinders 408, 414, 442, and 454 all coupled to the first crankshaft 402 and rotationally phased to put the first and second pistons 406 and 412 at top dead center at the same time that the third and fourth pistons 440 and 454 are at bottom dead center, comprise an upper four cylinder boxer engine. In this configuration the upper front two cylinder boxer module is phased one hundred eighty crankshaft degrees of rotation from the upper rear two cylinder boxer module. With this one hundred eighty degree phase difference between the upper front and upper rear two cylinder boxer modules, the first order yawing couples mutually cancel each other while the second order yawing couples and the crankshaft torsional vibrations add to each other. This upper four cylinder boxer engine operates with even firing intervals between cylinders.

A fifth piston 424 is operable to reciprocate in a fifth horizontal cylinder 426 via coupling with the second crankshaft 404. The fifth piston 424 is coupled to the second crankshaft 404 via a fifth connecting rod 428. A sixth piston 430 is operable to reciprocate in a sixth horizontal cylinder 432 via coupling with the second crankshaft 404. The sixth piston 430 is coupled to the second crankshaft 404 via a sixth connecting rod 434. A centerline of the fifth horizontal cylinder 426 is horizontally coplanar with a centerline of the sixth horizontal cylinder 432. The fifth horizontal cylinder 426 is oriented horizontally relative to the second crankshaft 404. The sixth horizontal cylinder 432 is oriented horizontally relative to the second crankshaft 404 in the opposite horizontal direction from the orientation of the fifth horizontal cylinder 426. The fifth and sixth horizontal cylinders 426 and 432 may further be oriented horizontally relative to a cylinder block of the engine 400. This combination of the fifth and sixth cylinders 426 and 432, coupled to the second crankshaft 404, comprise a lower front two cylinder boxer module, with the same inherent unbalance characteristics as the other two cylinder boxer modules.

A seventh piston 446 is operable to reciprocate in a seventh horizontal cylinder 448 via coupling with the second crankshaft 404. The seventh piston 446 is coupled to the second crankshaft 404 via a seventh connecting rod 450. An eighth piston 458 is operable to reciprocate in an eighth horizontal cylinder 460 via coupling with the second crankshaft 404. The eighth piston 458 is coupled to the second crankshaft 404 via an eighth connecting rod 462. A centerline of the seventh horizontal cylinder 448 is horizontally coplanar with a centerline of the eighth horizontal cylinder 460. The seventh horizontal cylinder 448 is oriented horizontally relative to the second crankshaft 404. The eighth horizontal cylinder 460 is oriented horizontally relative to the second crankshaft 404 in the opposite horizontal direction from the orientation of the seventh horizontal cylinder 448. The seventh and eighth horizontal cylinders 448 and 460 may further be oriented horizontally relative to a cylinder block of the engine 400. This combination of the seventh and eighth cylinders 448 and 460, coupled to the second crankshaft 404, comprise a lower rear two cylinder boxer module with the same inherent unbalance characteristics as the other two cylinder boxer modules.

The combination of the fifth, sixth, seventh, and eighth cylinders all coupled to the same second crankshaft 404, with the motions of the fifth, sixth, seventh, and eighth pistons phased to put the fifth and sixth pistons 424 and 430 at ninety degrees before or after top dead center while the seventh and eighth pistons 446 and 458 are at ninety degrees after or before top dead center, comprise a lower four cylinder boxer engine.

This is the same configuration used in the construction of the upper four cylinders of this eight cylinder engine. With the one hundred eighty degrees of crankshaft rotation difference between the phase of the lower front two cylinder boxer module and the lower rear two cylinder boxer module, the first order yawing couples mutually cancel while the second order yawing couples and the crankshaft torsional vibrations of these lower two cylinder boxer modules add to each other.

The combination of this lower four cylinder boxer engine with the upper four cylinder boxer engine constructed into the same cylinder block with appropriate phasing of rotation of the first crankshaft 402 to the second crankshaft 404 causes the inherent second order yawing couples generated by both the upper and the lower four cylinder boxer engines to mutually cancel each other while adding the crankshafts' torsional vibrations to each other. With the appropriate phasing of crankshaft rotations the firing pulses of the first crankshaft 402 alternate with the firing pulses of the second crankshaft 404, giving the overall engine 400 even firing intervals. By setting the firing order such that each piston fires at a different time, double firing may be avoided. With both crankshafts carrying an equal amount of rotating inertia and both crankshafts having the same magnitudes and phase angles of torsional vibration, but in opposite directions of rotation, the net inertial torsional vibration reacted against the cylinder block sums to zero.

The first, third, fifth, and seventh horizontal cylinders 408, 442, 426, and 448 form a left bank of the engine 400 and the second, fourth, sixth, and eighth horizontal cylinders 414, 454, 432, and 460 form a right bank of the engine 400. In the illustrated embodiment the left bank is positioned ahead of the right bank. Although it will be appreciated that the right bank may be positioned ahead of the left bank on the crankshafts without departing from the scope of the present description, The crankpins for the first piston 406, the second piston 412, the third piston 440, and the fourth piston 452 are rotationally positioned on the first crankshaft 402 such that the first piston 406 is top dead center in the first horizontal cylinder 408 and the second piston 412 is top dead center in the second horizontal cylinder 414 when the third piston 440 is bottom dead center in the third horizontal cylinder 442 and the fourth piston 452 is bottom dead center in the fourth horizontal cylinder 454. In other words, the first piston 406 and the second piston 412 are phased one hundred eighty degrees from the third piston 440 and the fourth piston 452.

The crankpins for the fifth, sixth, seventh, and eighth pistons 424, 430, 446, 458 are rotationally positioned on the second crankshaft 404 in the configuration that the crankpins for the first, second, third, and fourth pistons 406, 412, 440, 452 are positioned on the first crankshaft 402. In particular, the crankpins for the fifth piston 424, the sixth piston 430, the seventh piston 446, and the eighth piston 458 are rotationally positioned on the second crankshaft 404 such that the fifth piston 424 is top dead center in the fifth horizontal cylinder 426 and the sixth piston 430 is top dead center in the sixth horizontal cylinder 432 when the seventh piston 446 is bottom dead center in the seventh horizontal cylinder 448 and the eighth piston 458 is bottom dead center in the eighth horizontal cylinder 460. In other words, the fifth piston 424 and the sixth piston 430 are phased one hundred eighty degrees from the seventh piston 446 and the eighth piston 458.

Furthermore, the second crankshaft 404 is angularly rotated or phased ninety degrees from the first crankshaft 402. Accordingly, when the first, second, third, and fourth pistons are positioned at top dead center or bottom dead center, the fifth, sixth, seventh, and eighth pistons are positioned in the middle of the cylinders. Note that the second crankshaft 404 may be angularly rotated ninety degrees in a positive or negative direction relative to the first crankshaft 402 without departing from the scope of the presented description. Such an arrangement gives the eight cylinder engine 400 perfect dynamic balance, as well as giving each crankshaft even firing intervals, thus reducing the torsional preload needed between the two crankshafts to avoid tooth separation, or backlash between meshing gears.

The crankpins for the third piston 440 and the fourth piston 452 are rotationally positioned on the first crankshaft 402 such that the third piston 440 and the fourth piston 452 are angularly displaced one hundred eighty degrees from first piston 406 or the second piston 412 on the first crankshaft 402. In other words, the third piston 440 and the fourth piston 452 are advanced or retarded one hundred eighty degrees relative to the first piston 406 or the second piston 412. The crankpins for the seventh piston 446 and the eighth piston 458 are rotationally positioned on the second crankshaft 404 such that the seventh piston 446 and the eighth piston 458 are angularly displaced one hundred eighty degrees from fifth piston 424 or the sixth piston 430 on the second crankshaft 404. In other words, the seventh piston 446 and the eighth piston 458 are advanced or retarded one hundred eighty degrees relative to the fifth piston 424 or the sixth piston 430.

In some embodiments, the centerlines of the first, second, third, and fourth cylinders may be coplanar with each other and with a centerline of the first crankshaft in a first plane. The centerlines of the fifth, sixth, seventh, and eighth cylinders may be coplanar with each other and with a centerline of the second crankshaft in a second plane that is parallel with the first plane. Furthermore, the centerlines of the first and second crankshafts may be coplanar in a third plane that is perpendicular to the first and second planes.

In some embodiments, the centerlines of the first, second, third, fourth, fifth, sixth, seventh, and eighth cylinders may parallel to each other, and perpendicular to a plane including a centerline of the first crankshaft and a centerline of the second crankshaft. Furthermore, the centerlines of the first, second, third, fourth, fifth, sixth, seventh, and eighth cylinders may be offset from and not intersecting the centerlines of the first or second crankshafts.

FIG. 5 shows an embodiment of a pushrod valvetrain 500 that may be implemented with an engine according to the present description. For example, the valvetrain 500 may be implemented with the engines 200, 300, 400 or another suitable engine configuration. Specifically, the valvetrain 500 may be implemented in an engine including a first crankshaft 502 that is vertically coplanar with a second crankshaft 504.

A first piston 506 is operable to reciprocate in a first horizontal cylinder 508 via coupling with the first crankshaft 502. The first horizontal cylinder 508 may receive intake air from an intake manifold 510 and may exhaust combustion gases via an exhaust manifold 512. The intake manifold 510 can selectively communicate with the first horizontal cylinder 508 via an intake valve 514 and the exhaust manifold 512 can selectively communicate with the first horizontal cylinder 508 via an exhaust valve 520. In some embodiments, the first horizontal cylinder 508 may include two or more intake valves and/or two or more exhaust valves.

The intake valve 514 may be controlled by cam actuation via a first camshaft 518 that is positioned above the first horizontal cylinder 508 and above the first crankshaft 502. In particular, rotation of the first camshaft 518 actuates a pushrod 516 that is coupled to the intake valve 514 via a rocker arm to actuate the intake valve 514. The exhaust valve 520 may be controlled by cam actuation via a second camshaft 524 that is positioned above the first horizontal cylinder 508 and above the first crankshaft 502 and below the first camshaft 518. In particular, rotation of the second camshaft 524 actuates a pushrod 522 that is coupled to the exhaust valve 520 via a rocker arm to actuate the exhaust valve 520.

A second piston 526 is operable to reciprocate in a second horizontal cylinder 528 via coupling with the second crankshaft 504. The second horizontal cylinder 528 may receive intake air from an intake manifold 530 and may exhaust combustion gases via the exhaust manifold 512. Due to the vertically coplanar arrangement of the first horizontal cylinder 508 and the second horizontal cylinder 528, the exhaust manifold may be shared by the horizontal cylinders and may be oriented horizontally between the horizontal cylinders. The intake manifold 530 can selectively communicate with the second horizontal cylinder 528 via an intake valve 532 and the exhaust manifold 512 can selectively communicate with the second horizontal cylinder 528 via an exhaust valve 538. In some embodiments, the second horizontal cylinder 528 may include two or more intake valves and/or two or more exhaust valves.

The intake valve 532 may be controlled by cam actuation via a third camshaft 536 that is positioned below the second horizontal cylinder 528 and below the second crankshaft 504. In particular, rotation of the third camshaft 536 actuates a pushrod 534 that is coupled to the intake valve 532 via a rocker arm to actuate the intake valve 532. The exhaust valve 538 may be controlled by cam actuation via a fourth camshaft 542 that is positioned below the second horizontal cylinder 528 and below the second crankshaft 504 and above the third camshaft 536. In particular, rotation of the fourth camshaft 542 actuates a pushrod 540 that is coupled to the exhaust valve 538 via a rocker arm to actuate the exhaust valve 538. By positioning the camshafts above and below the crankshafts and providing valve actuation via pushrods, the engine package may be made narrower relative to engines that include horizontal cylinders where the camshaft is located in the cylinder head.

Note that the crankshafts are shown in simplified form with straight gear teeth, but it will be appreciated that the crankshafts may include helical gears that couple via a helical gear mesh as described above. Further, note that the rocker arms for the intake and exhaust valves are positioned separately, but each may share a support structure with rocker arms of other intake and exhaust valves. For example, if each cylinder includes two intake valves, then the rocker arms of the two intake valves may be supported by the same support structure (e.g., a shared support rod).

FIG. 6 shows another embodiment of a pushrod valvetrain 600 that may be implemented with an engine according to the present description. Components of the valvetrain 600 that may be substantially the same as those of the valvetrain 500 are identified in the same or similar way and are described no further. However, it will be noted that components identified in the same way in different embodiments of the present description may be at least partly different. The orientation of the push rods is modified in the valvetrain 600 relative to the orientation of the pushrods in the valvetrain 500 to align the rocker arms for the intake and exhaust valves of each cylinder. Such alignment may facilitate a common support structure to be shared by the rocker arms of both the intake and exhaust valves in the valvetrain 600. For example, if each cylinder includes two intake valves and two exhaust valves, then the rockers of the two intake valves and the two exhaust valves may be supported by the same support structure (e.g., a shared support rod).

FIG. 7 shows an embodiment of an intake and exhaust layout 700 that may be implemented with an engine according to the present description. For example, the intake and exhaust layout 700 may be implemented in each bank of the engine 400. Further, the intake and exhaust layout 700 may be implemented with the valvetrains 500 and 600. It will be appreciated that the intake and exhaust layout 700 may be implemented with any suitable engine that includes horizontally oriented cylinders arranged into banks. Although the intake and exhaust layout 700 includes four cylinders, it will be appreciated that the intake and exhaust layout may be adapted for more or fewer cylinders. For example, the layout may be adapted for a six cylinder bank in a twelve cylinder engine.

For a two cylinder bank in a four cylinder engine, such as the engine 300, it may be desirable for each cylinder bank to connect to just one intake manifold at either the front or the rear face of the cylinder head, with one exhaust manifold at the opposite face. A single intake manifold at each bank gives the advantage of fewer parts and easier assembly.

The layout 700 includes a first cylinder 702, a second cylinder 704, a third cylinder 706, and a fourth cylinder 708. The first cylinder 702 includes two intake valves that are supplied intake air by an intake manifold 710. The second cylinder 704 includes two intake valves that are supplied intake air by an intake manifold 712. The third cylinder 706 includes two intake valves that are supplied intake air by an intake manifold 714. The fourth cylinder 708 includes two intake valves that are supplied intake air by an intake manifold 716. In some embodiments, each intake manifold may include a separate air inlet to receive intake air. In some embodiments, the intake manifolds 710 and 712 may join to form an air inlet positioned above the first and second cylinders 702 and 704 to receive intake air, and the intake manifolds 714 and 716 may join to form an air inlet positioned below the third and fourth cylinders 706 and 708 to receive intake air. In some embodiments, the intake manifolds 710, 712, 714, and 716 may join to for a shared air inlet to receive intake air.

The first and third cylinders 702 and 706 may be vertically coplanar, and the second and fourth cylinders 706 and 708 may be vertically coplanar. The first and second cylinders 702 and 704 may be vertically spaced apart from the third and fourth cylinders 706 and 708 in order to accommodate the gear sets of the vertically coplanar crankshafts. The vertical spacing provide suitable space for an exhaust manifold 718 to be shared by the first, second, third, and fourth cylinders. The shared exhaust manifold 718 is positioned substantially below the first and second cylinders 702 and 704 and above the third and fourth cylinders 706 and 708. Note that the intake and exhaust layout is merely an example and other layouts may be implemented without departing from the scope of the present description.

FIG. 8 shows another embodiment of a valvetrain 800 that may be implemented with an engine that includes two valves per cylinder. Components of the valvetrain 800 that may be substantially the same as those of the valvetrain 500 are identified in the same or similar way and are described no further. However, it will be noted that components identified in the same way in different embodiments of the present description may be at least partly different.

The upper cylinders in the cylinder bank each includes an intake port that receives intake air from the intake manifold 810 and an exhaust port that exhausts combustion gas to the exhaust manifold 812. The intake manifold 810 and the exhaust manifold 812 may be positioned side-by-side on the upper cylinders of the cylinder bank. In other words, the intake manifold 810 and the exhaust manifold 812 may be shared by the upper cylinders. The intake manifold 810 can selectively communicate with the first horizontal cylinder 808 via an intake valve 814 and the exhaust manifold 812 can selectively communicate with the first horizontal cylinder 808 via an exhaust valve 816. The intake valve 814 may be controlled by cam actuation via a first camshaft 818 that is positioned below the first horizontal cylinder 808 and above the second crankshaft 804. In particular, rotation of the first camshaft 818 actuates a tappet 820 that is coupled to the intake valve 814 via a rocker arm to actuate the intake valve 814. The exhaust valve 816 may also be controlled by cam actuation via the first camshaft 818.

The lower cylinders in the cylinder bank each includes an intake port that receives intake air from the intake manifold 826 and an exhaust port that exhausts combustion gas to the exhaust manifold 828. The intake manifold 826 and the exhaust manifold 828 may be positioned side-by-side on the lower cylinders of the cylinder bank. In other words, the intake manifold 826 and the exhaust manifold 828 may be shared by the lower cylinders. The intake manifold 826 can selectively communicate with the second horizontal cylinder 824 via an intake valve 830 and the exhaust manifold 828 can selectively communicate with the second horizontal cylinder 824 via an exhaust valve 832. The intake valve 830 may be controlled by cam actuation via a second camshaft 834 that is positioned above the second horizontal cylinder 824 and below the first crankshaft 802. In particular, rotation of the second camshaft 834 actuates a tappet 836 that is coupled to the intake valve 830 via a rocker arm to actuate the intake valve 830. The exhaust valve 832 may also be controlled by cam actuation via the second camshaft 834. Note each of the first and second camshafts may be operable to actuate valves for one or more cylinders of the engine bank.

Alternatively, on a two cylinder engine bank the intake ports may receive inlet air from the front face of the cylinder head while the exhaust ports direct the exhaust gasses toward the rear face of the cylinder head. This would allow one intake manifold at the front of the cylinder bank to supply inlet air to both cylinders 806 and 822 while one exhaust manifold would collect exhaust gasses from both cylinders 806 and 822.

FIG. 9 shows another embodiment of a valvetrain 900 that may be implemented with an engine that includes two valves per cylinder. Components of the valvetrain 900 that may be substantially the same as those of the valvetrain 800 are identified in the same or similar way and are described no further. However, it will be noted that components identified in the same or similar way in different embodiments of the present description may be at least partly different.

Like valvetrain 800, the upper cylinders share an intake manifold 910 and the lower cylinders share an intake manifold 926 in the valvetrain 900. However, in valvetrain 900, both of the upper cylinders and the lower cylinders share the same exhaust manifold 912. The intake manifold 910 may be positioned above the upper cylinders and the exhaust manifold 912 may be positioned substantially below the upper cylinders of the cylinder bank. The intake manifold 910 can selectively communicate with the first horizontal cylinder 908 via an intake valve 914 and the exhaust manifold 912 can selectively communicate with the first horizontal cylinder 908 via an exhaust valve 916. The intake valve 914 may be controlled by cam actuation via a first camshaft 920 that is positioned below the first horizontal cylinder 908 and above the second crankshaft 904. In particular, rotation of the first camshaft 920 actuates a pushrod 918 that is coupled to the intake valve 914 via a rocker arm to actuate the intake valve 914. The exhaust valve 916 may also be controlled by cam actuation via the first camshaft 920.

The intake manifold 926 may be positioned below the lower cylinders and the exhaust manifold 912 may be positioned substantially above the lower cylinders of the cylinder bank. The intake manifold 926 can selectively communicate with the second horizontal cylinder 924 via an intake valve 928 and the exhaust manifold 912 can selectively communicate with the second horizontal cylinder 924 via an exhaust valve 930. The intake valve 928 may be controlled by cam actuation via a second camshaft 934 that is positioned above the second horizontal cylinder 924 and below the first crankshaft 902. In particular, rotation of the second camshaft 934 actuates a pushrod 932 that is coupled to the intake valve 928 via a rocker arm to actuate the intake valve 928. The exhaust valve 930 may also be controlled by cam actuation via the second camshaft 934. Note each of the first and second camshafts may be operable to actuate valves for one or more cylinders of the engine bank.

Note that the terms "horizontal" and "vertical" as well as other directions described herein are defined relative to the crankshafts of the engine, and not necessarily with respect to gravity as the engine may be positioned in various orientations in a vehicle with respect to the ground.

It will be noted that the figures included in this disclosure are schematic, and views of the illustrated embodiments are generally not drawn to scale; aspect ratios, feature size, and numbers of features may be purposely distorted to make selected features or relationships easier to see.

It will be appreciated that the configurations disclosed herein are exemplary in nature, and that these specific embodiments are not to be considered in a limiting sense, because numerous variations are possible. For example, the above technology can be applied to a suitable even number of opposed cylinders including 2, 4, 6, 8, 10, 12, etc. Finally, it will be understood that the articles, systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine comprising:
a first crankshaft;
a second crankshaft coupled with the first crankshaft such that the first crankshaft and the second crankshaft are coplanar;
a first piston operable to reciprocate in a first cylinder via coupling with the first crankshaft; and
a second piston operable to reciprocate in a second cylinder via coupling with the second crankshaft, the second cylinder being opposing and collinear with the first cylinder, and a centerline of the cylinders being parallel to a plane of the crankshafts.

2. The engine of claim 1, wherein the first piston is top dead center in the first cylinder when the second piston is top dead center in the second cylinder.

3. The engine of claim 1, wherein the first and second crankshafts are mechanically coupled such that the second crankshaft rotates in an opposite direction from the first crankshaft.

4. The engine of claim 1, wherein a centerline of the first crankshaft, a centerline of the second crankshaft, a centerline of the first cylinder, and a centerline of the second cylinder are all coplanar.

5. The engine of claim 1, wherein a centerline of the first crankshaft and a centerline of the second crankshaft are coplanar in a first plane, and a centerline of the first cylinder and a centerline of the second cylinder are coplanar in a second plane that is parallel to and offset from the first plane.

6. The engine of claim 1, further comprising:
a transmission that is coupled to the first crankshaft or the second crankshaft, and the first crankshaft and the second crankshaft include thrust control bearings that oppose axial gear forces from the first and second crankshafts and from the transmission.

7. The engine of claim 1, wherein a moment of inertia of the first crankshaft along with a first mechanism that is coupled tightly with the first crankshaft to rotate in the same direction as the first crankshaft is equivalent to a moment of inertia of the second crankshaft along with a second mechanism that is coupled tightly with the second crankshaft to rotate in the same direction as the second crankshaft.

8. The engine of claim 1, wherein the first cylinder fires at a different time than the second cylinder.

9. The engine of claim 1, further comprising:
a third piston operable to reciprocate in a third cylinder via coupling with the first crankshaft; and
a fourth piston operable to reciprocate in a fourth cylinder via coupling with the second crankshaft, the fourth cylinder being opposing and collinear with the third cylinder, and the first piston being top dead center in the first cylinder and the second piston being top dead center in the second cylinder when the third piston is bottom dead center in the third cylinder and the fourth piston is bottom dead center in the fourth cylinder.

10. An engine comprising:
a first crankshaft;
a second crankshaft coupled with the first crankshaft such that the first crankshaft and the second crankshaft axes of rotation are coplanar and the second crankshaft rotates in an opposite direction from the first crankshaft;
a first piston operable to reciprocate in a first cylinder via coupling with the first crankshaft;
a second piston operable to reciprocate in a second cylinder via coupling with the first crankshaft;
a third piston operable to reciprocate in a third cylinder via coupling with the first crankshaft;
a fourth piston operable to reciprocate in a fourth cylinder via coupling with the first crankshaft;
a fifth piston operable to reciprocate in a fifth cylinder via coupling with the second crankshaft;
a sixth piston operable to reciprocate in a sixth cylinder via coupling with the second crankshaft;
a seventh piston operable to reciprocate in a seventh cylinder via coupling with the second crankshaft; and
an eighth piston operable to reciprocate in an eighth cylinder via coupling with the second crankshaft, wherein the first piston is top dead center in the first cylinder and the second piston is top dead center in the second cylinder when the third piston is bottom dead center in the third cylinder and the fourth piston is bottom dead center in the fourth cylinder, and with ninety degrees of rotation of the crankshafts, the fifth piston is top dead center in the fifth cylinder and the sixth piston is top dead center in the sixth cylinder when the seventh piston is bottom dead center in the seventh cylinder and the eighth piston is bottom dead center in the eighth cylinder.

11. The engine of claim 10, wherein centerlines of the first, second, third, and fourth cylinders are coplanar with each other and with a centerline of the first crankshaft in a first plane, centerlines of the fifth, sixth, seventh, and eighth cylinders are coplanar with each other and with a centerline of the second crankshaft in a second plane that is parallel with the first plane; and the centerlines of the first and second crankshafts are coplanar in a third plane that is perpendicular to the first and second planes.

12. The engine of claim 10, wherein centerlines of the first, second, third, fourth, fifth, sixth, seventh, and eighth cylinders are parallel to each other, and perpendicular to a plane including a centerline of the first crankshaft and a centerline of the second crankshaft, and the centerlines of the first, second, third, fourth, fifth, sixth, seventh, and eighth cylinders being offset from and not intersecting the centerlines of the first and second crankshafts.

13. The engine of claim 10, wherein one or more cylinders are deactivated at part load or no load operating conditions.

14. The engine of claim 10, further comprising:
a first cylinder head coupled to the first, third, fifth, and seventh cylinders, the first cylinder head forming a first exhaust manifold shared between the first, third, fifth, and seventh cylinders, and positioned below the first and third cylinders and above the fifth and seventh cylinders; and
a second cylinder head coupled to the second, fourth, sixth, and eighth cylinders, the second cylinder head forming a second exhaust manifold shared between the second, fourth, sixth, and eighth cylinders, and positioned below the second and fourth cylinders and above the fourth and eighth cylinders.

15. The engine of claim 10, wherein the first crankshaft includes a first helical gear set that is rotatable in a first direction, and the second crankshaft includes a second helical gear set that is rotatable in a second direction that opposes the first direction.

* * * * *